United States Patent
Shah

(10) Patent No.: US 9,124,857 B2
(45) Date of Patent: Sep. 1, 2015

(54) METHOD AND APPARATUS FOR CONTEXT-AWARE AUTOMATIC ZOOMING OF A VIDEO SEQUENCE

(71) Applicant: Adobe Systems Inc., San Jose, CA (US)

(72) Inventor: Abhishek Shah, Pitam Pura (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 55 days.

(21) Appl. No.: 13/760,405

(22) Filed: Feb. 6, 2013

(65) Prior Publication Data

US 2014/0219636 A1 Aug. 7, 2014

(51) Int. Cl.
*G11B 27/00* (2006.01)
*H04N 9/87* (2006.01)

(52) U.S. Cl.
CPC .................................. *H04N 9/87* (2013.01)

(58) Field of Classification Search
USPC ........... 715/716, 719, 723; 386/278, 280–282
See application file for complete search history.

(56) References Cited

U.S. PATENT DOCUMENTS

| | | | |
|---|---|---|---|
| 7,805,678 B1 | 9/2010 | Niles et al. | |
| 2003/0090504 A1* | 5/2003 | Brook et al. | 345/716 |
| 2010/0281381 A1 | 11/2010 | Meaney et al. | |
| 2012/0042251 A1 | 2/2012 | Rodriguez | |
| 2012/0210230 A1 | 8/2012 | Matsuda et al. | |
| 2012/0210231 A1* | 8/2012 | Ubillos et al. | 715/723 |
| 2012/0284622 A1* | 11/2012 | Avery et al. | 715/719 |

* cited by examiner

*Primary Examiner* — Thai Tran
*Assistant Examiner* — Mishawn Dunn
(74) *Attorney, Agent, or Firm* — Keller Jolley Preece

(57) ABSTRACT

A computer implemented method and apparatus for context-aware automatic zooming of a video sequence. The method comprises receiving a command to alter a selected video clip of a video sequence visualized on a timeline display; automatically adjusting a timeline display representative of the video sequence to a calculated zoom level, wherein the zoom level allows visualization of editable content in the timeline display; receiving an indication that the altering operation is completed; and automatically resetting the timeline display representative of the video sequence to an original zoom level.

20 Claims, 4 Drawing Sheets

METHOD AND APPARATUS FOR CONTEXT-AWARE AUTOMATIC ZOOMING OF A VIDEO SEQUENCE

BACKGROUND OF THE INVENTION

1. Field of the Invention

Embodiments of the present invention generally relate to software interoperability and compatibility and, more particularly, to a method and apparatus for context-aware automatic zooming of a video sequence.

2. Description of the Related Art

Many video content editing software applications provide a timeline panel for viewing of a video sequence. A timeline view is typically a graphical representation in a horizontal panel of a user graphical interface for the editing software, showing one or more video clips that comprise the video sequence and their arrangement within the video sequence. For example, a horizontal timeline may be established, with each video clip being represented by a horizontal bar that provides a visual indication of the start and end points of each clip within a time axis. Each clip comprises a plurality of thumbnails, wherein each thumbnail represents a plurality of frames of a video clip. Further, a level of zoom may be selected at which to view the video sequence in the timeline panel. When the zoom decreases, the number of pixels per time increases, meaning a greater amount of a given video clip is represented in a single thumbnail.

A user may manipulate the video sequence within the timeline panel in order to trim (or shorten the duration of) a clip or reorder the clips within a sequence of clips. Typically, the trim operation is performed by selecting the rightmost edge of a horizontal bar in the timeline panel, representing the end of a selected clip, and then moving that edge left along the timeline to a desired new end of the clip. However, it is difficult to perform the trim operation precisely when the pixels per unit time along the timeline is high because a small amount of movement of the horizontal bar along the timeline results in a large number of frames in the clip to be trimmed. Currently, a user must manually select a larger zoom setting in order to more closely view the clip so as to provide more precision in trimming a clip.

Similarly, when reordering a clip within a sequence of clips, depending upon the selected zoom level, not all clips may be seen within the timeline. In this case, it is difficult to move a selected clip to a target location within the sequence, especially when the new location is not visible within the timeline. As the pixels per time increases, it is difficult to recognize the target location and a user may need to repeat the operation one or more times in order to properly reorder the video clips. This results in a poor user experience.

Therefore, there is a need for a method and apparatus for context-aware automatic zooming of a video sequence.

SUMMARY OF THE INVENTION

A method and apparatus for context-aware automatic zooming of a video sequence substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
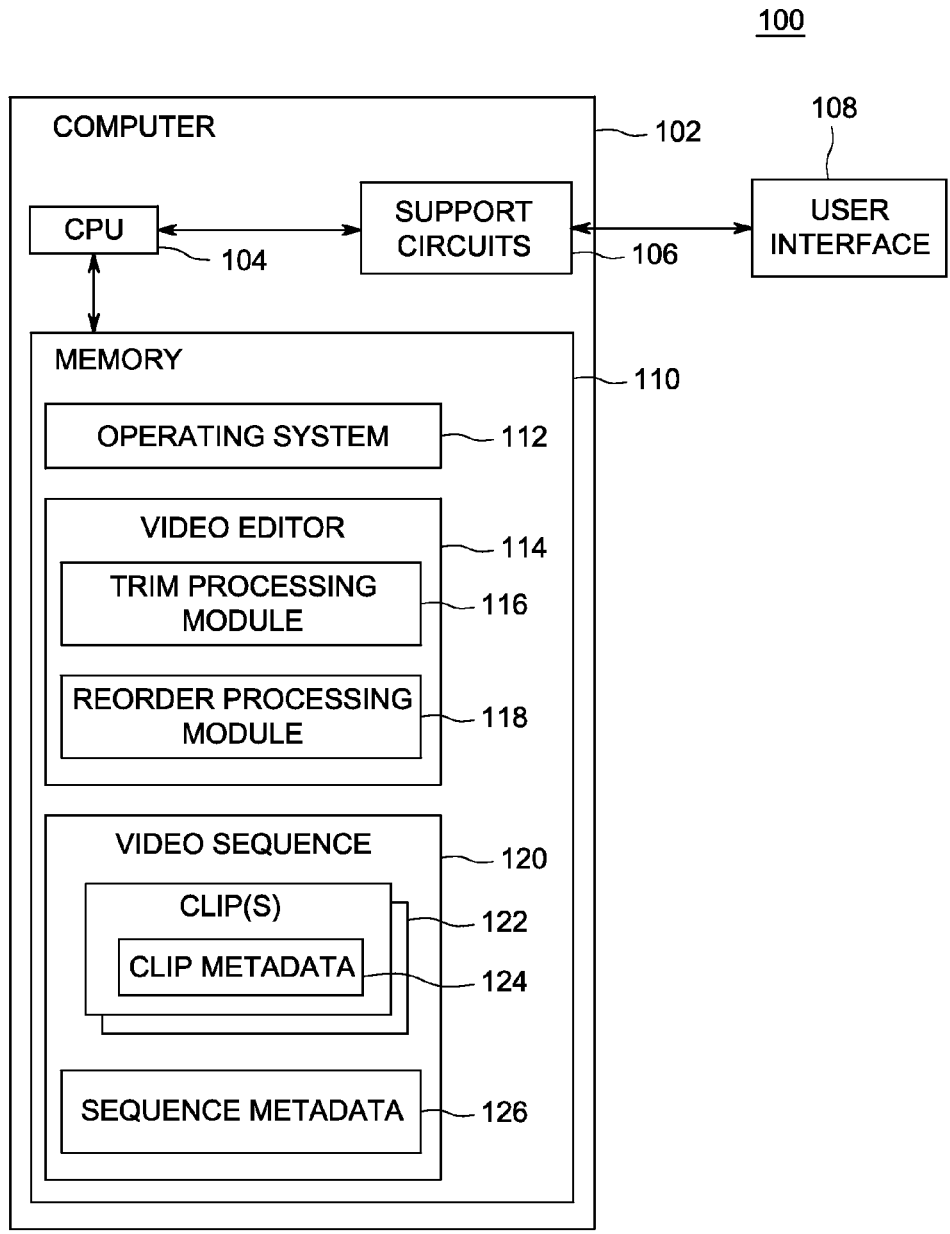
FIG. 1 is a block diagram of a system for context-aware automatic zooming of a video sequence, according to one or more embodiments.

While the method and apparatus is described herein by way of example for several embodiments and illustrative drawings, those skilled in the art will recognize that the method and apparatus for context-aware automatic zooming of a video sequence is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for context-aware automatic zooming of a video sequence defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Additionally, the term "video sequence" is intended to include a plurality of sequential image frames, with or without accompanying audio, which image frames may be representative of still images, moving images, animated or graphical images, and the like, without limitation.

DETAILED DESCRIPTION OF EMBODIMENTS

Embodiments of the present invention comprise a method and apparatus for context-aware automatic zooming of a video clip in a timeline. When performing a trimming operation on a clip, the embodiments determine a current pixels per second (pps) of a displayed clip in a timeline based on the clip duration and zoom level. The zoom level is adjusted such that the clip occupies the entire visible area of the timeline so that a user may then perform the trim operation with precision. When the trim operation is complete, the zoom is automatically reset to the original level.

When performing a reordering operation of one or more clips of a plurality of clips of a video sequence in a timeline, the embodiments determine a current pixels per second (pps) of the timeline based on the sequence duration and zoom level. The zoom level is adjusted such that the entire sequence occupies the visible area of the timeline. Then, while the user moves an indicator along the timeline so as to indicate selection of a new location for a selected clip, a previous frame and a next frame are displayed indicating the precise location where the selected clip will be dropped should the indicated location be selected. When the reorder operation is complete, the selected clip occupies the new location and the zoom is automatically reset to the original level.

Advantageously, the embodiments provide methods for video sequence editing wherein adjusting the zoom during editing is performed automatically, thereby improving the editing experience for the user.

Various embodiments of a method and apparatus for context-aware automatic zooming of a video sequence are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system for context-aware automatic zooming of a video sequence, according to one or more embodiments. The system 100 comprises a computer 102. The computer 102 comprises a Central Processing Unit (CPU) 104, support circuits 106, a user-interface 108, and a memory 110. The CPU 104 may comprise one or more commercially available microprocessors or microcontrollers that facilitate data processing and storage. The various support circuits 106 facilitate the operation of the CPU 104 and include one or more clock circuits, power supplies, cache, input/output circuits, and the like. The user interface 108 comprises one or more input devices, such as a mouse and keyboard and at least one output device, such as a display. The memory 110 comprises at least one of Read Only Memory (ROM), Random Access Memory (RAM), disk drive storage, optical storage, removable storage and/or the like.

The memory 110 comprises an operating system 112, a video editor 114 and a video sequence 120. The video editor 114 may be any video editor, such as ADOBE® Premiere Elements, ADOBE® Premiere Pro, and the like, capable of performing editing operations on a video sequence. The video editor 114 comprises a trim processing module 116 and a reorder processing module 118. The video sequence 120 comprises at least one clip 122 comprising a plurality of frames of video image, and associated video sequence metadata 126. Additionally, each clip 122 includes clip metadata 124. The operating system 112 may comprise various commercially known operating systems.

A trim operation is detected by the video editor 114. In some embodiments, a trip operation is detected when a user performs a mouse down on an end edge of a video clip 122 that is presented to the user in a timeline panel of the video editor 114 that is displayed on a display portion of the user interface 108. Upon initiation of the trim operation on video clip 122, the trim processing module 116 accesses the sequence metadata 126 and the clip metadata 124 to retrieve the sequence duration and zoom level of the sequence. The sequence duration and zoom level are used to calculate the current pixels per second. Pixels per second describes how many pixels on the timeline panel represent one second of video. The trim processing module 116 then determines the clip duration, sequence duration, width of the clip (in pixels), width of the sequence (in pixels), and width of the visual area of the sequence in the timeline panel display (in pixels). The trim processing module 116 then adjusts the amount of zoom such that the clip 122 will occupy the entire visible area of the timeline panel display by calculating a new pixels per second, a new sequence width, and a new zoom level based on the new pixels per second and new sequence width.

The trim processing module 116 updates the support circuits 106 with the new zoom level such that the user-interface 108 displays the clip 122 in the timeline panel display so as to occupy the entire visible area of the timeline panel display. The trim processing module 116 determines when the trim operation is complete by detecting a mouse up operation on the edge of the displayed clip 122. The trim processing module 116 calculates a new sequence duration using the trimmed clip, resets the zoom level reflected in the timeline panel display to the original zoom level prior to the trim operation and updates the display of the sequence on the user-interface 108.

In some embodiments, when a user performs a mouse down on a video clip 122 displayed in the timeline panel and drags the mouse along the timeline, a reorder operation is detected by the video editor 114. In some embodiments, a clip may be selected in a user interface and a menu item may be selected to move the clip. Upon initiation of a reorder operation on a video clip 122, the reorder processing module 118 accesses the sequence metadata 126 and the clip metadata 124 to retrieve the sequence duration and zoom level of the sequence. The sequence duration and zoom level are used to calculate the current pixels per second. The reorder processing module 118 then determines the sequence duration, width of the sequence (in pixels), and width of the visual area of the sequence in the timeline panel display (in pixels). The reorder processing module 118 then adjusts the zoom level such that the video sequence 120 occupies the entire visible area of the timeline panel display by calculating a new pixels per second, a new sequence width, and a new zoom level based on the new pixels per second and new sequence width.

The reorder processing module 118 updates the support circuits 102 based the new zoom level such that the user-interface 108 displays the video sequence 120 in the timeline panel display so as to occupy the entire visible area of the timeline panel display.

During the reorder operation, while the selected clip 122 is dragged, the reorder processing module 118 displays feedback of the location within the timeline of the current location. The reorder processing module 118 causes display to the user, via user interface 108, of a previous frame and a next frame in between which the selected clip will be placed should the mouse up operation be complete. The reorder processing module 118 determines when the reorder operation is complete by detecting a mouse up operation on the clip 122. The reorder processing module 118 resets the zoom level to be reflected in the timeline panel display to the original zoom level used prior to the reorder operation and updates the display of the sequence in the timeline panel using the original zoom level.

Figure 2:
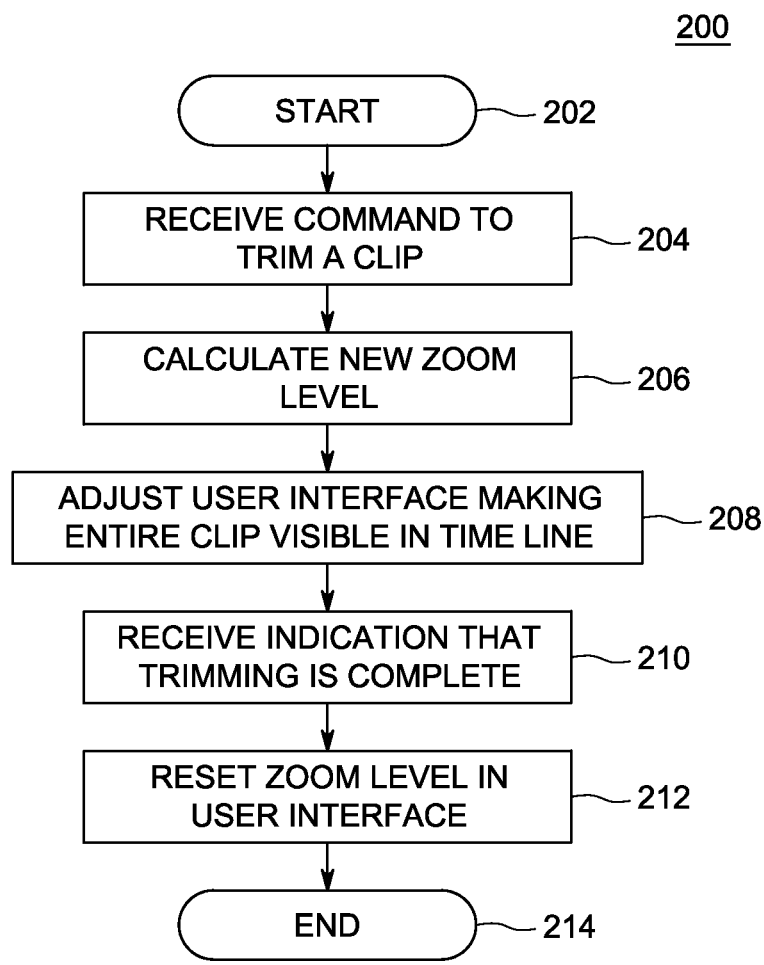
FIG. 2 depicts a flow diagram of a method for trimming a clip in a video sequence, as performed by the trim processing module of FIG. 1, according to one or more embodiments.

FIG. 2 depicts a flow diagram of a method 200 for trimming a clip in a video sequence, as performed by the trim processing module 116 of FIG. 1, according to one or more embodiments. The method 200 receives a command to trim a clip and then adjusts the zoom level such that the clip occupies the entire visible area of the timeline. A user may perform the trim operation to shorten the duration of the clip. When the trim operation is complete, the method 200 automatically resets the zoom to the original level.

The method 200 starts at step 202 and proceeds to step 204. At step 204, the method 200 receives a command to trim a clip. The command may be a mouse down on the edge of a clip displayed in the timeline panel or any command within the video editor that indicates the initiation of trimming a clip. The method 200 proceeds to step 206, where the method 200 calculates a new zoom level that will allow the entire clip to be viewed in the visible area of the timeline panel based on calculation of an original pixels per second (origpps). The method 200 accesses metadata to determine the duration of the video sequence (seqDuration). The method 200 then determines the original pixels per second as follows:

origpps=width of timeline panel (in pixels)/seqDuration

The method 200 accesses additional metadata associated with the video sequence as well as metadata associated with the clip being trimmed. The metadata includes:
cDuration=clip duration of the clip for which trimming is being performed,
seqDuration=duration of the entire sequence,
cWidth=width of the clip being trimmed (in pixels),
sWidth=width of the sequence (in pixels),
vWidth=width of the visible area of the timeline panel (in pixels).

The new pixels per second (npps) is calculated using the equation newpps=vWidth/cDuration The method 200 calculates a new sequence width using the equation:

newSequenceWidth=seqDuration*newpps

The method 200 then calculates the new zoom level using the new pixels per second and the new sequence width as follows:

nZoomLevel=original zoom level*(newpps/origpps)

The method 200 proceeds to step 208, where the method 200 adjusts the user interface support circuits 106 to prepare the clip for trimming. The method 200 sets the zoom level reflected in the timeline panel display to the nZoomLevel value calculated in step 206. The entire clip is now viewable in the timeline panel display. The method 200 also resets the mouse position to the new position of the end of the clip being trimmed. The method 200 may also adjust other user interface values such as a scrollbar in the timeline panel display, and the like.

The method 200 proceeds to step 210, where the method 200 receives an indication that the trimming operation is complete. In some embodiments, the command is in the form of a mouse up operation on the edge of a clip in the timeline. However, any command within the video editor that indicates the completion of trimming a clip may be used.

The method 200 proceeds to step 212, where the method 200 resets the zoom level reflected in the timeline panel display to the original zoom level that was calculated prior to the start of the trimming the clip. The method 200 determines the new sequence duration after the clip has been trimmed and then resets the zoom level reflected in the timeline panel display using the origpps and the new sequence duration. The method 200 proceeds to step 214 and ends.

Figure 3:
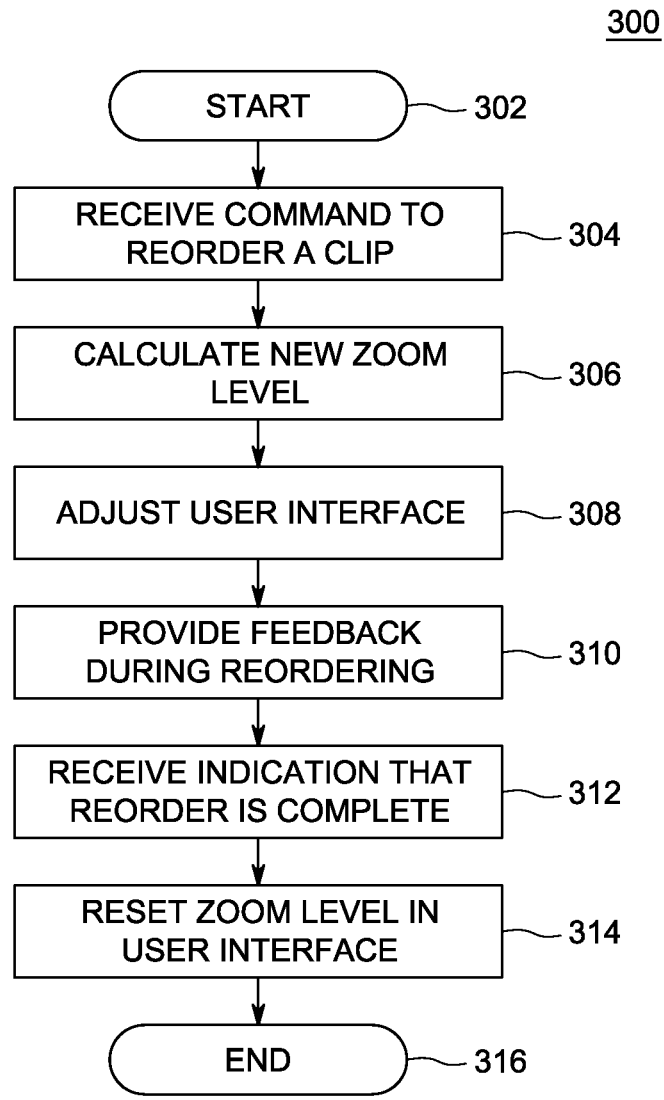
FIG. 3 depicts a flow diagram of a method for reordering a clip in a video sequence, as performed by the reorder processing module of FIG. 1, according to one or more embodiments.

FIG. 3 depicts a flow diagram of a method 300 for reordering a clip in a video sequence, as performed by the reorder processing module 118 of FIG. 1, according to one or more embodiments. The method 300 receives a command to reorder clips in a video sequence. The method 300 adjusts the zoom level such that the entire sequence occupies the visible area of the timeline panel display. Then, while the user moves an indicator along the timeline so as to indicate selection of a new location for a selected clip, a previous frame and a next frame are displayed indicating the precise location where the selected clip will be dropped should the indicated location be selected. When the reorder operation is complete, the method 300 automatically resets the zoom to the original level.

The method 300 starts at step 302 and proceeds to step 304. At step 304, the method 300 receives a command to reorder a clip. In some embodiments, the command to reorder a clip may be in the form of a mouse down operation followed by a dragging operation on the clip. However, any command to initiate movement of a clip to a new location may be used.

The method 300 proceeds to step 306, where the method 300 calculates a new zoom level that will allow the entire sequence to be viewed in the visible area of the timeline panel display. The method 300 calculates an original pixels per second (origpps). The original pixels per second is the pixels per second before the clip is moved. The method 300 accesses metadata associated with the video sequence to determine the sequence duration (seqDuration).

origpps=width of timeline panel (in pixels)/seqDuration

The method 300 then accesses additional metadata associated with the video sequence. The metadata includes:
seqDuration=duration of the entire sequence,
sWidth=width of the sequence (in pixels), and
vWidth=width of the visible area of the timeline panel (in pixels)

The new pixels per second (newpps) is calculated using the equation:

newpps=vWidth/seqDuration

The method 300 calculates a new sequence width using the equation:

newSequenceWidth=seqDuration*newpps

The method 300 then calculates the new zoom level using the new pixels per second and the new sequence width as follows:

nZoomLevel=original zoom level*(newpps/origpps)

The method 300 proceeds to step 308, where the method 300 adjusts the user interface support circuits 106 to prepare the reordering of the clip. The method 300 sets the zoom level reflected in the timeline panel display to the nZoomLevel value calculated in step 306. The entire sequence is now viewable in the timeline panel display. The method 300 also resets the mouse position to the new position of the clip.

The method 300 proceeds to step 310, where the method 300 provides feedback to the user during the reordering of the clip. In some embodiments, a clip may be reordered between two other clips. As the clip is dragged along the timeline, the method 300 causes display to the user, via user interface 108 of the contents of the clips between which the clip is being dragged. For example, if a video sequence is comprised of five clips (e.g., clip1, clip2, clip3, clip4, and clip5) and a user drags clip2 to the right along the timeline, the method 300 causes display of the end of clip3 and the beginning of clip4 as clip2 is dragged over the timeline where clip3 is located. Should the user continue to drag clip2 past the beginning of clip4, the method 300 causes display of the end of clip4 and the beginning of clip5, making the new location for clip2 clear to the user as being between clip 4 and clip5, thereby resulting in a very efficient reordering operation. In some embodiments, at least one frame previous to the new location and at least one frame subsequent to the new location is displayed. In other embodiments, the thumbnails of the at least one previous and at least one subsequent frame is enlarged. In other embodiments, the frames or thumbnails are shown in the video display. In other embodiments, the frames or thumbnails are shown in the timeline display.

The method 300 proceeds to step 312, where the method 300 receives a indication that the reorder operation is complete. In some embodiments, the indication is in the form of a mouse up operation on the clip in the timeline. However, any command within the video editor that indicates the completion of reordering a clip may be used.

The method 300 proceeds to step 314, where the method 300 resets the zoom level reflected in the timeline panel display to the original zoom level that was calculated prior to the start of the reordering of the clip. The method 300 then resets the zoom level using the original pps with the reordered clip in its new location. The method 300 proceeds to step 316 and ends.

FIGS. 4A-4D together depict an illustration of the method 200 for trimming a clip in a video sequence as performed by the trim processing module 116 of FIG. 1, according to one or more embodiments. The video editor 402 comprises a timeline display 406, a clip comprising a plurality of thumbnails 408, and a clip handle 410.

Figure 4A:
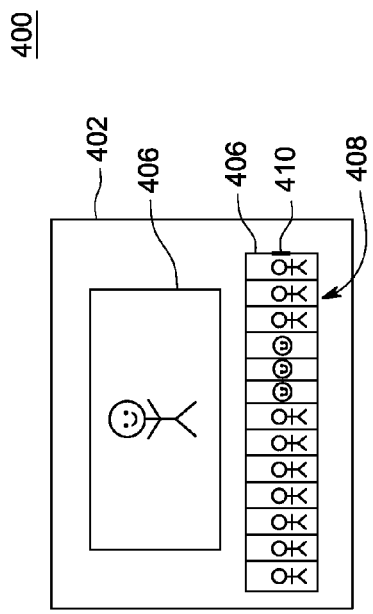
FIGS. 4A-4D together depict an illustration of the method for trimming a clip in a video sequence as performed by the trim processing module of FIG. 1, according to one or more embodiments.

FIG. 4A depicts a clip comprising a plurality of thumbnails 408 within a timeline display 406. Each thumbnail 408 represents a plurality of frames of the clip. The number of frames each thumbnail 408 represents is dependent on a zoom level.

Figure 4B:
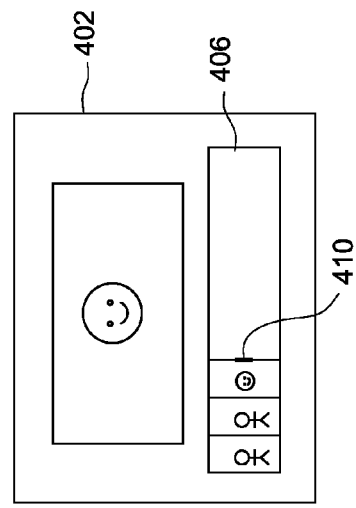

FIG. 4B depicts a video editor 402 after the trimming operation has been initiated by performing a mouse down operation on the clip handle 410. A new zoom level is determined and the display adjusted such that the entire clip is able to be viewed within the timeline display 406.

Figure 4C:
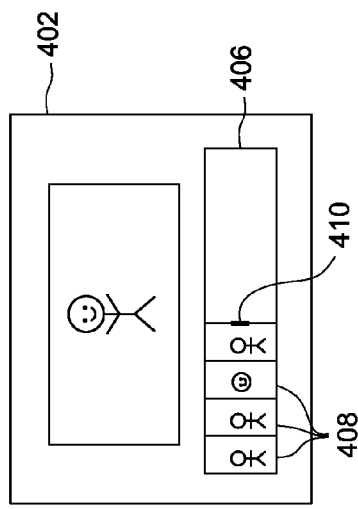

FIG. 4C depicts trimming the video clip in the timeline display 406. Dragging the clip handle 410 along the timeline display 406 trims the clip back to frame 412.

Figure 4D:
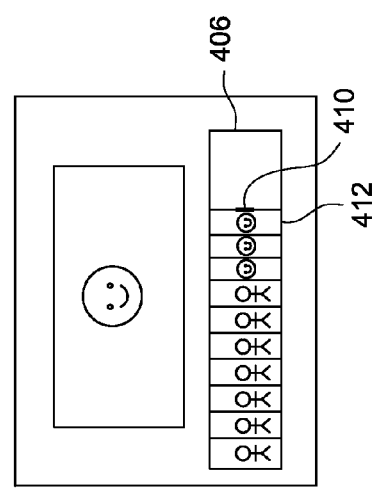

FIG. 4D depicts the video editor 402 after the trim operation is complete. A mouse up operation on the trim handle 410 indicates the completion of the trim operation. Upon completion, the zoom level in the timeline display 406 is reset to the original zoom level determined in FIG. 4A.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method of providing a context-aware automatic zooming when altering digital video content, comprising:
presenting a plurality of representations of one or more video clips in a video sequence on a timeline display, the representations corresponding to an associated number of frames of the one or more video clips;
receiving an altering command that initiates an altering operation relative to at least one representation of the timeline display corresponding to a first number of frames of at least a portion of a video clip;
calculating a zoom level in response to the altering command; and
adjusting, by at least one processor, the timeline display to the calculated zoom level upon receiving the altering command by performing one or more of the following:
expanding the at least one representation into two or more representations each corresponding to a second number of frames of the at least a portion of the video clip, the second number of frames being less than the first number of frames; or
collapsing two or more of the plurality of representations into a new representation, the new representation corresponding to a third number of frames of the at least a portion of the video clip, the second number of frames being more than the first number of frames.

2. The method of claim 1, wherein receiving an altering command comprises receiving a command to trim a targeted video clip from the one or more video clips in the video sequence.

3. The method of claim 2, wherein the two or more representations collectively correspond to all frames of the targeted video clip.

4. The method of claim 1, wherein receiving an altering command comprises receiving a command to reorder a designated video clip from the one or more video clips in the video sequence from a first location to a new location.

5. The method of claim 2, wherein the command to trim a targeted video clip comprises a selection of the targeted video clip and an indication of frames to remove from the targeted video clip.

6. The method of claim 4, wherein the command to reorder the designated video clip comprises a selection of the designated video clip and an indication of the new location for the designated video clip and the new location is at least one of the beginning of the video sequence, between two of the one or more video clips in the video sequence, between two frames of a video clip in the video sequence, or at the end of the video sequence.

7. The method of claim 1, further comprising upon completion of the altering operation, presenting a final plurality of representations of one or more video clips in the video sequence on the timeline display, the final representations corresponding to an associated number of frames of the one or more video clips.

8. A non-transitory computer-readable medium for storing computer instructions that, when executed by at least one processor causes the at least one processor to perform a method for context-aware automatic zooming of a video sequence, comprising: presenting a plurality of representations of one or more video clips in a video sequence on a timeline display, the representations corresponding to an associated number of frames of the one or more video clips; receiving an altering command that initiates an altering operation relative to at least one representation of the timeline display corresponding to an associated number of frames of the one or more video clips; calculating a zoom level in response to the altering command; and adjusting the timeline display to the calculated zoom level upon receiving the altering command by expanding the at least one representation into two or more representations each corresponding to a second number of frames of the at least a portion of the video clip, the second number of frames being less than the first number of frames.

9. The computer-readable medium of claim 8, wherein receiving an altering command comprises receiving a command to trim a targeted video clip in the video sequence.

10. The computer-readable medium of claim 9, wherein the two or more representations collectively correspond to all frames of the targeted video clip.

11. The computer-readable medium of claim 9, wherein the command to trim a targeted video clip comprises a selection of the targeted video clip and an indication of frames to remove from the targeted video clip.

12. The computer-readable medium of claim 8, wherein receiving an altering command comprises receiving a command to reorder a designated video clip from the one or more video clips in the video sequence from a first location to a new location.

13. The computer-readable medium of claim 12, wherein the command to reorder the designated video clip comprises a selection of the designated video clip and an indication of the new location for the designated video clip and the new location is at least one of the beginning of the video sequence, between two clips in the video sequence, between two frames of a video clip in the video sequence, or at the end of the video sequence.

14. The computer-readable medium of claim 8, further comprising upon completion of the altering operation, presenting a final plurality of representations of one or more video clips in the video sequence on the timeline display, the final representations corresponding to an associated number of frames of the one or more video clips.

15. A computer-implemented method of providing a context-aware timeline display when altering digital video content, comprising: presenting a plurality of representations of one or more video clips in a video sequence on a timeline display, the representations corresponding to a first number of frames of the one or more video clips; receiving an altering command that initiates an altering operation relative to at least one representation of the timeline display; calculating a zoom level in response to the altering command; and adjusting, by at least one processor, the timeline display to the calculated zoom level upon receiving the altering command by collapsing two or more of the representations into a new representation, the new representation corresponding to a second number of frames of the at least a portion of the video clip, the second number of frames being more than the first number of frames.

16. The method of claim 15, wherein receiving the altering command comprises receiving a command to reorder a designated video clip from the one or more video clips in the video sequence from one location in the video sequence to a second location in the video sequence.

17. The method of claim 16, wherein the two or more representations collectively correspond to all frames within the video sequence.

18. The method of claim 16, further comprising displaying, in response to the command to reorder, additional frames from one or more video clips corresponding to the new location.

19. The method of claim 18, wherein displaying additional frames comprises displaying one or more frames immediately before the new location and one or more frames immediately after the new location.

20. The method of claim 15, further comprising, upon completion of the altering operation, presenting a final plurality of representations of one or more video clips in the video sequence on the timeline display, the final representations corresponding to an associated number of frames of the one or more video clips.

* * * * *